Figure 1:
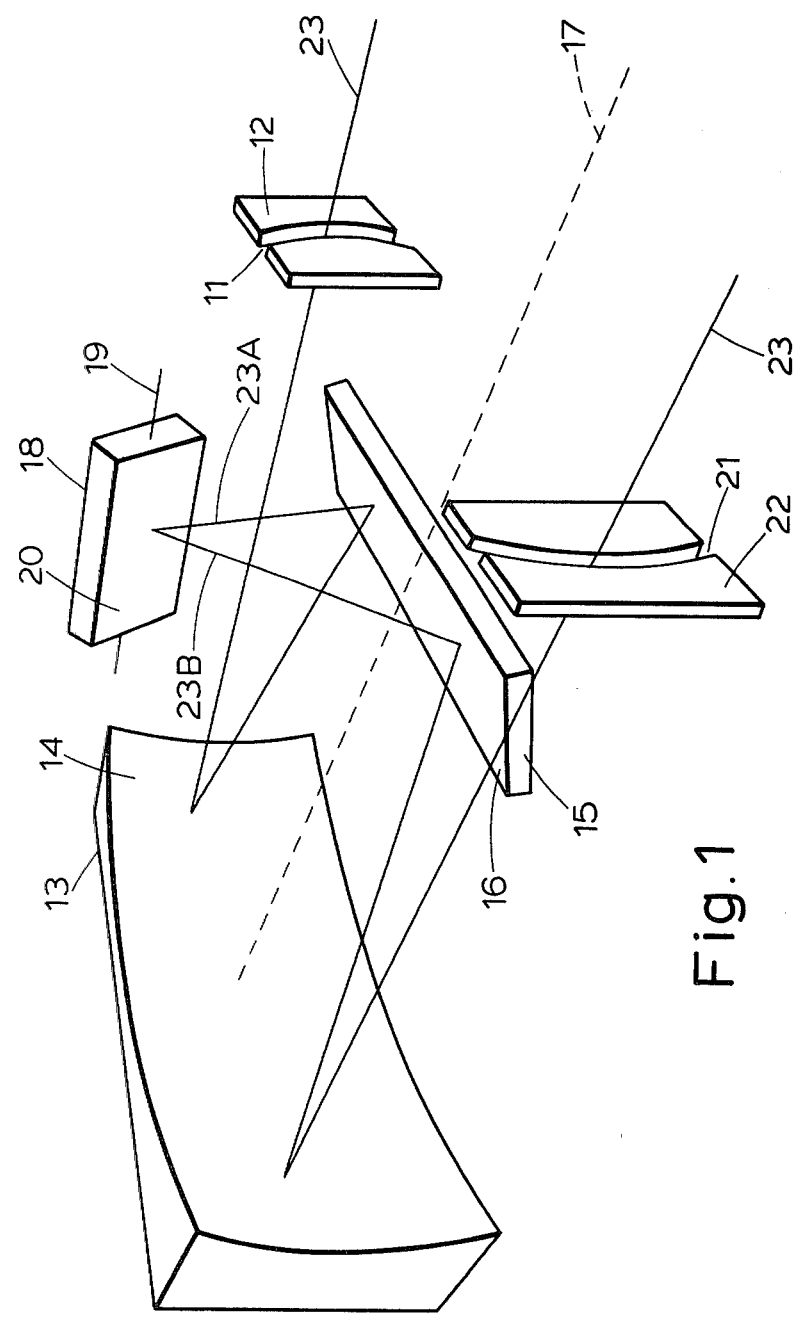

United States Patent [19]

Perkins et al.

[11] 4,310,244
[45] Jan. 12, 1982

[54] MONOCHROMATOR

[75] Inventors: Charles V. Perkins, Cambridge; John R. Firth, Silverstone, both of England

[73] Assignee: U.S. Philips Corporation, New York, N.Y.

[21] Appl. No.: 125,010

[22] Filed: Feb. 27, 1980

[30] Foreign Application Priority Data

Mar. 2, 1979 [GB] United Kingdom ............ 07535/79

[51] Int. Cl.³ .............................................. G01J 3/18
[52] U.S. Cl. .................................................. 356/334
[58] Field of Search ................ 350/162 R; 356/305, 356/319, 326, 328, 331–334

[56] References Cited

U.S. PATENT DOCUMENTS 2,757,568 8/1956 Fastie .................................. 356/328
3,069,966 12/1962 White .................................. 356/334

FOREIGN PATENT DOCUMENTS 43-11438 5/1968 Japan .................................. 356/334

OTHER PUBLICATIONS

Finkelstein, *Journal of the Optical Society of America*, vol. 41, No. 3, Mar. 1951, pp. 179–182.
Fastie, *Journal of the Optical Society of America*, vol. 42, No. 9, Sep. 1952, pp. 647–651.

Primary Examiner—F. L. Evans
Attorney, Agent, or Firm—Paul R. Miller

[57] ABSTRACT

An Ebert monochromator for a spectrophotometer in which the diffraction grating is positioned off of the central optical axis of the collimator mirror by interpositioning a plane mirror between the collimator mirror and the diffraction grating. The plane mirror may be movable to select one of several diffraction gratings. By arranging the diffraction grating about an axis parallel with the central optical axis, a simple mechanical wavelength drive system with a common cam shaft driving the grating, a filter holder, and a rotatable slit plate can be provided. Further gratings may be driven from the cam shaft as may also the movable plane mirror which selects them.

14 Claims, 5 Drawing Figures

MONOCHROMATOR

The present invention relates to monochromators.

A monochromator is an optical device for deriving monochromatic light from polychromatic light, the expression "light" being used in this context to mean electro-magnetic radiation in the ultra-violet, visible and infra-red bands.

One form of monochromator adapted for use in spectrophotometric apparatus, since its rediscovery by Fastie in 1952, is the monochromator originally proposed by Ebert in 1889. The Ebert monochromator described by Fastie in the Journal of the Optical Society of America, Volume 42, No. 9 (p. 641 et seq.), possesses good spectral resolution and minimal aberration in addition to being more simple, compact and mechanically stable than other commonly employed monochromators.

The monochromator described by Fastie includes a collimating concave spherical mirror and a plane diffraction grating mounted for rotation about an axis parallel to the grooves on the face of the grating and perpendicular to the central optical axis of the spherical mirror. The grating is positioned on the central optical axis adjacent the entrance and exit slits of the monochromator, which lie in the focal plane of the mirror and also lie upon the circumference of a circle having as its centre the central optical axis of the spherical mirror.

The positioning of the plane diffraction grating upon the central optical axis of the spherical mirror adjacent the slits has proved a constraint upon the mechanical design of the associated spectrophotometer and, in particular, of the mechanical wavelength drive system as in a complex instrument it may be necessary to provide a wavelength-related drive to vary the width of entrance and exit slits, to position radiation filters and, commonly in infra-red instruments, to index a rotating turret carrying two or more diffraction gratings.

It is an object of the present invention to provide a modified Ebert monochromator in which the diffraction grating is positioned off the central optical axis of the concave spherical mirror, thereby permitting advantageous mechanical constructions to be achieved.

According to the present invention an Ebert monochromator comprises a concave spherical mirror, means defining first and second slits which lie in a common plane perpendicular to the central optical axis of the concave spherical mirror, and a diffraction grating pivotable about an axis parallel to the grooves on it, in which a beam of light entering the first slit is collimated by the concave spherical mirror and directed onto the diffraction grating and in which the dispersed beam of light from the diffraction grating is reflected from the concave spherical mirror towards the second slit, characterised in that the axis about which the diffraction grating is pivotable is positioned off the central optical axis of the concave spherical mirror, and beam directing means is provided in the optical path between the spherical concave mirror and the diffraction grating wherein the beam directing means is positioned relative to the mirror and diffraction grating such that the plane containing both the optical center line of the collimated beam incident upon the diffraction grating and the optical center line of the beam dispersed by the diffraction grating intersects the diffraction grating at right angles to the grooves upon it. This results in a construction of Ebert monochromator in which the diffraction grating can be positioned optimally in relation to, for example, the elements of a wavelength drive system and away from the entrance and exit slits.

The monochromator may include at least one further diffraction grating pivotable about an axis parallel with the grooves on it with the beam directing means positionable to include either the diffraction grating or the further diffraction grating in the optical path of the monochromator whereby an extended wavelength range may be covered.

The monochromator may have the beam directing means positioned such that the axis about which the diffraction grating is pivotable is disposed parallel to the central optical axis of the concave spherical mirror, and where two diffraction gratings are employed the beam directing means may be positioned such that the axes about which both diffraction gratings are pivotable are both disposed parallel to the central optical axis of the concave spherical mirror, making possible further simplifications of the wavelength drive system.

In a double grating monochromator according to the invention both diffraction gratings may be pivotable, and the beam directing means position adjustable in synchronism driven from a common wavelength drive mechanism. Such a monochromator may have the diffraction gratings and the beam directing means driven from a common cam-shaft forming part of the wavelength drive mechanism with the common cam-shaft arranged parallel to the central optical axis of the concave spherical mirror for simplicity of construction. The monochromator may further comprise a filter-holder movable to introduce a selected one of a plurality of filters mounted thereon into the beam of light entering the monochromator, the filter-holder also being driven from the common cam-shaft whereby the filters may be introduced in a wavelength dependent manner.

A monochromator according to the invention may be constructed such that the slit defining means is a common lamina in which the slits are apertures, with the lamina mounted for movement along the central optical axis of the concave spherical mirror, to enable the slits to be precisely located in the focal plane of the concave spherical mirror. The lamina may be a disc in which the slits are apertures rotatable about the central optical axis of the concave spherical mirror, whereby to vary slit width in accordance with monochromator wavelength. The rotable lamina may also be driven from the common cam-shaft.

The beam directing means of the monochromator is preferably a plane mirror to enable energy losses in the path between the concave spherical mirror and the diffraction grating to be kept to a minimum.

Figure 2:
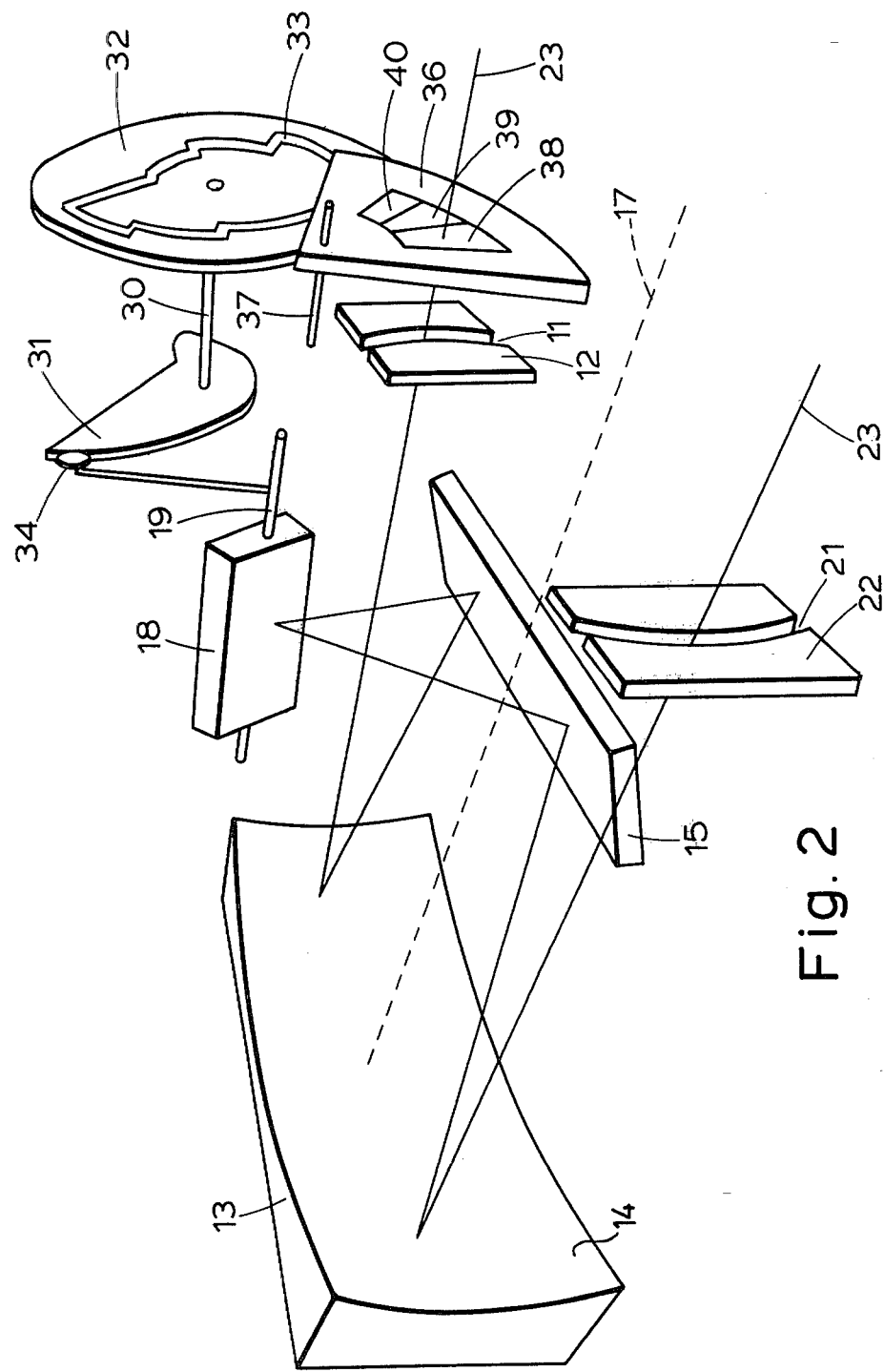
Figure 3:
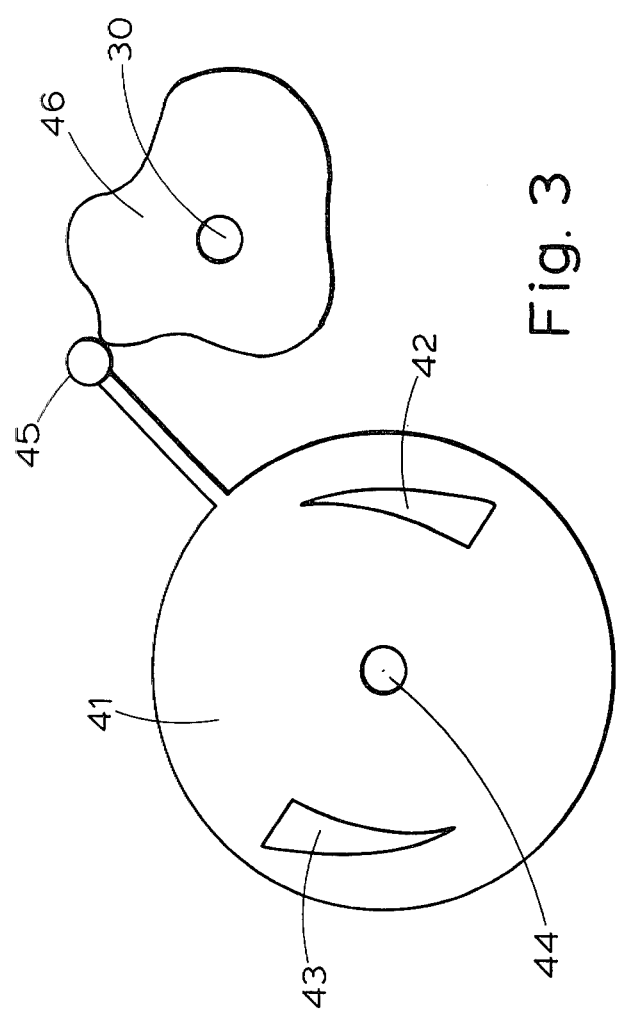
Figure 4:
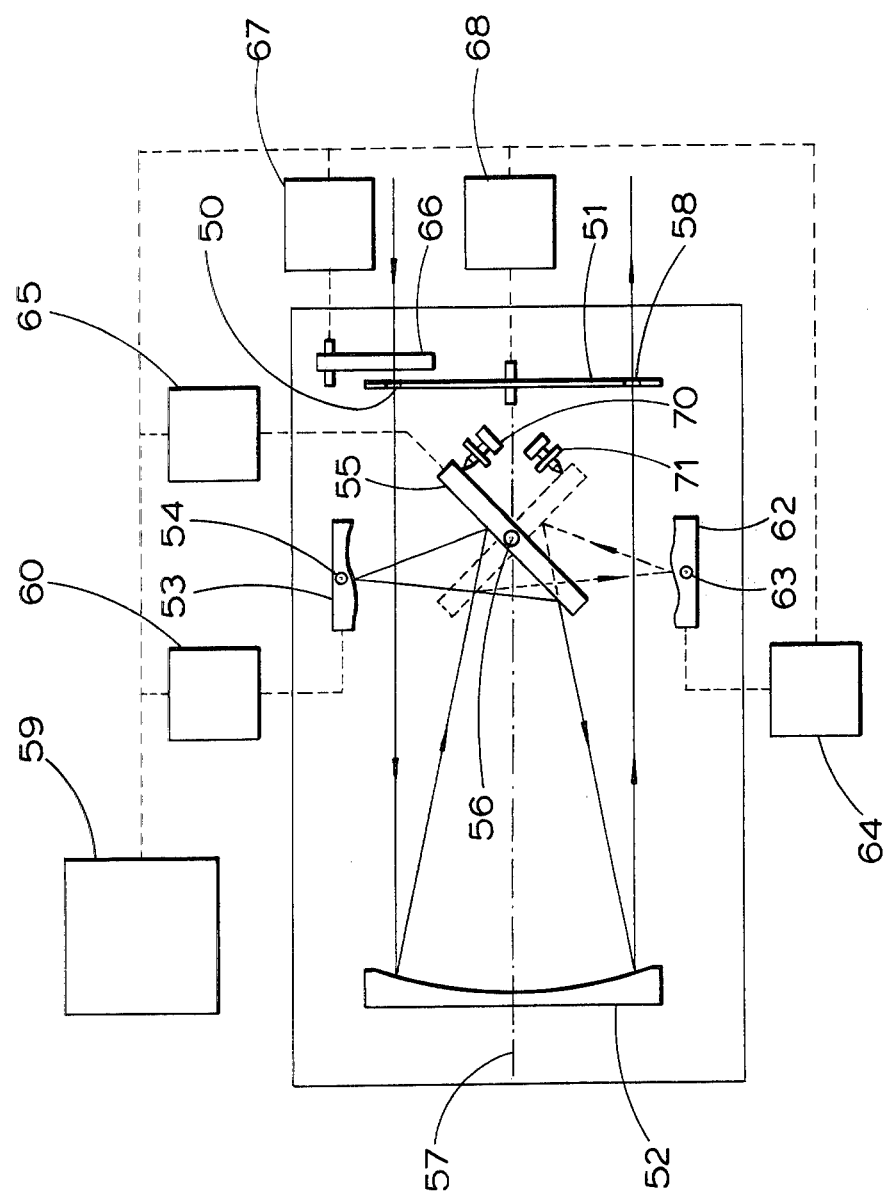
Figure 5:
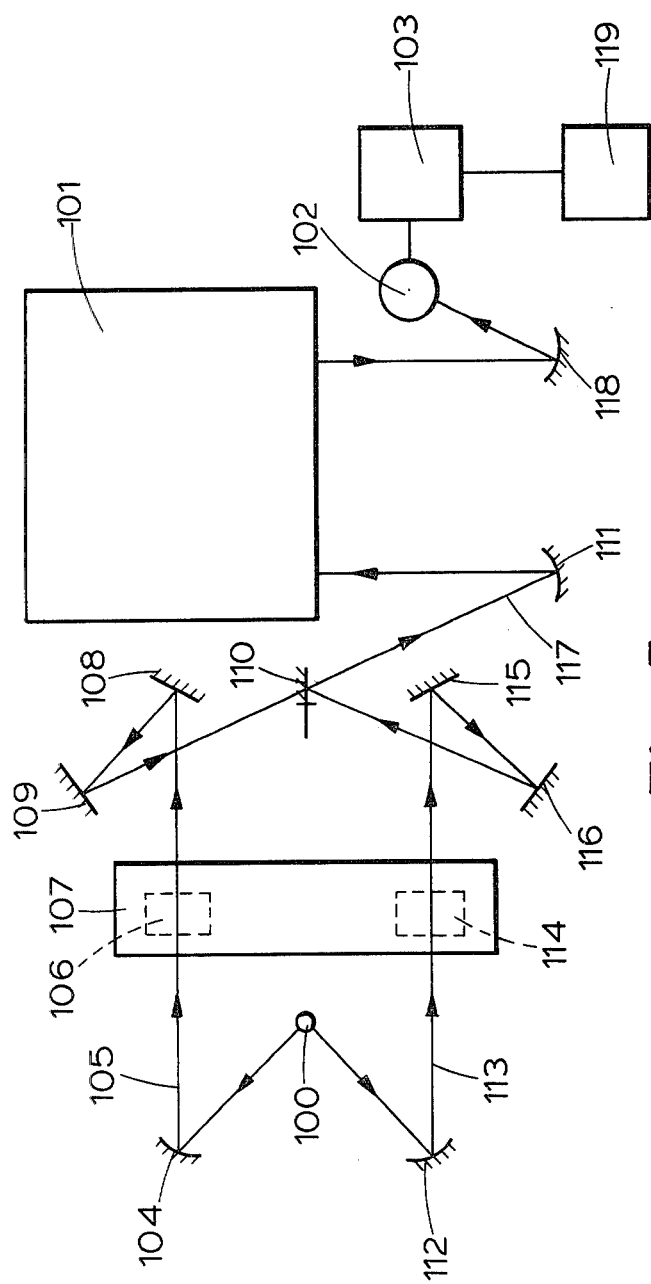

Preferred constructions of Ebert monochromator are illustrated in the accompanying drawings of which:

FIG. 1 shows a perspective view of an Ebert monochromator according to the invention, FIG. 2 shows a perspective view of the Ebert monochromator of FIG. 1 with the addition of certain wavelength drive components, FIG. 3 shows a rotatable slit plate suitable for incorporation in the monochromator of FIG. 2, FIG. 4 shows, partly in plane and in diagrammatic form, a double grating monochromator in accordance with the invention, and FIG. 5 shows in diagrammatic form a dual beam spectrophotometer incorporating a monochromator according to the present invention.

FIG. 1 is a perspective view of an Ebert monochromator in accordance with the present invention.

The monochromator comprises an entrance slit 11 formed in a slit plate 12; a plano-concave spherical collimator mirror 13 with a reflective surface 14; a plane mirror 15, with a reflective surface 16, mounted upon the central optical axis 17 of mirror 13 and inclined to it; a plane diffraction grating 18 mounted for rotation about an axis 19 parallel to the grooves upon the active face 20 of the grating and parallel to the central optical axis 17 of mirror 13; and an exit slit 21 formed in a slit plate 22. Slit plates 12 and 22 lie in, or in a plane closely adjacent the parallel to, the focal plane of mirror 13 and slits 11 and 21 are disposed about the circumference of a circle centered upon the central optical axis 17 of mirror 13, the so-called Ebert circle.

From a suitable source (not shown) a beam of light brought to a focus in slit 11 is collimated by mirror 13, reflected from mirror 15 and falls upon the active face 20 of plane diffraction grating 18.

The dispersed beam from the diffraction grating 18 falls upon mirror 15 and is reflected on to mirror 13 and brought to a focus in the plane of exit slit 21. The line 23 is the optical center line of the beam of light from entrance slit 11 to exit slit 21.

As plane diffraction grating 18 is rotated about axis 19 by drive means (not shown) between predetermined mechanical limits, the dispersed beam of light is scanned across the rear of slit plate 22 and the wavelength of the beam of light emergent from exit slit 21 is a function of the angular disposition of grating 18 to the collimated beam incident upon it.

In the monochromator illustrated in FIG. 1, plane diffraction grating 18 is disposed with axis 19 parallel to central optical axis 17 of concave spherical mirror 13 and vertically above it. The plane mirror 15 inclined at 45° to the central optical axis 17, deflects the collimated beam from mirror 13 and the dispersed beam from grating 18 through 90°.

Grating 18 may be disposed with its axis 19 in other positions off the central optical axis 17 provided only that beam directing mirror 15 is positioned relative to it and to concave spherical mirror 13 such as to ensure that the plane defined by the optical center line 23A of the collimated beam from mirror 13 and the optical center line 23B of the dispersed beam from grating 18 intersects the grooves of grating 18 at right angles.

FIG. 2 is a perspective view of the Ebert monochromator described in relation to FIG. 1, with the addition of certain mechanical wavelength drive components to illustrate the simpler mechanical construction made possible by a monochromator constructed according to the present invention. Integers already described bear the same reference numerals.

A camshaft 30 disposed parallel with the central optical axis 17 of mirror 13 is driven by, for example, a stepping motor (not shown) and carries a cam 31 and a disc 32 having a camslot 33 in one face. A cam-follower 34 attached to a grating pivot 19 follows the camming surface of cam 31 and a pin (not shown) carried upon the rear face of a filter holder 36 pivotably mounted upon a shaft 37, engages in and follows the cam slot 33 in disc 32. Filter holder 36 carries three radiation filters 38, 39 and 40 which are positioned in the incoming beam of light to the monochromator in a series of wavelength dependent steps to prevent unwanted higher wavelength orders of light from grating 18 appearing at exit slit 21.

Rotation of camshaft 30 causes grating 18 to rotate scanning the dispersed light beam across exit slit 21. The relationship between the wavelength of the light emergent from exit slit 21 and the angular position of camshaft 30 is dependent upon the law of cam 31. Disc 32 is positioned upon cam-shaft 30 such that radiation filters 38, 39 and 40 are introduced into incoming light beam in sequence corresponding with predetermined wavelength ranges of the emergent beam from exit slit 21.

Further cams may be mounted upon cam-shaft 30 to drive other wavelength-dependent elements in a monochromator according to the invention. For example it is common practice to vary the width of slits 11 and 21 in a wavelength dependent manner to achieve approximately constant energy through the monochromator over the scanned wavelength. This is readily achieved in the monochromator described in FIG. 2 by the addition of the slit plate assembly shown in FIG. 3.

A slit plate 41 has extended slits 42 and 43 formed in it, disposed about the circumference of the Ebert circle of the associated monochromator. The plate 41 is mounted for rotation upon a shaft 44 axially aligned with the central optical axis 17 of the associated monochromator. Cam follower 45 attached to slit plate 41 follows the periphery of cam 46 secured to common camshaft 30 of the monochromator described in relation to FIG. 2, causing slit plate 41 to rotate upon shaft 44, to provide the correct width of slit in the incoming and outgoing beams at any wavelength.

To extend the range of the monochromator of FIG. 2 a further diffraction grating or gratings could be provided each pivotable on an axis parallel to that of grating 18 and rotated by means of a cam carried by camshaft 30. The grating cams would be arranged upon camshaft 30 to permit each grating to disperse a specific waveband and for the wavebands to be successive. Beam directing means such as, for example, a pivoted plane mirror could also be driven from the same cam shaft 30 to direct collimated radiation from mirror 13 to each diffraction grating in turn.

FIG. 4 is a diagrammatic representation in plan of a double grating monochromator according to the invention, and the wavelength drive system associated therewith.

A beam of light from a source (not shown) is brought to a focus in entrance slit 50 in rotatable slit plate 51, is collimated by a plano-concave spherical mirror 52 and directed on to the active surface of diffraction grating 53 rotatable about an axis 54 parallel with the grooves on it and perpendicular to the plane of the paper, by a mirror 55. Mirror 55 is rotatable about an axis 56 which is perpendicular to the plane of the paper and passes through the central optical axis 57 of mirror 52. The dispersed beam is directed to mirror 52 by mirror 55 and focussed in the region of exit slit 58.

Grating 54 is rotatable under the control of a wavelength drive means 59, e.g. a stepping motor, coupled to it through a suitable drive device 60, e.g. a cam and follower, to give the desired relationship between angular rotation of wavelength drive means 59 and the wavelength of the light emerging from slit 58.

Mirror 55 is able to adopt a second position (shown in dotted outline) in which the collimated beam from mirror 52 is directed on to a second plane diffraction grating 62, rotatable about axis 63 parallel with the grooves on it and perpendicular to the plane of the paper, also driven from wavelength drive means 59 through a drive device 64.

In operation grating 54 is rotated by drive means 59 through drive device 60, causing the focussed dispersed beam of light to traverse exit slit 58. At the extremity of the wavelength range of grating 54, mirror 55 is driven to its second position by a drive device 65 e.g. an electric motor controlled by a microswitch operated from drive means 59, in which grating 62 receives the collimated light from mirror 52. By arranging grating 62 to scan a wavelength range successive to that scanned by grating 54 the monochromator is able to produce an extended wavelength range at exit slit 58. Grating 54, mirror 55 and grating 62 are linked through the respective drive devices 60, 65 and 64 to wavelength drive means 59 for synchronous operation, thereby allowing the full wavelength range of the monochromator to be covered in a continuous manner.

Order suppressing filters carried in a filter-holder 66 are also introduced into the incoming beam of light in a synchronous manner, driven from the wavelength drive means 59 through a drive device 67, e.g. a cam and follower.

Slit plate 51 is driven from the wavelength drive means 59 through a drive device 68, e.g. a cam and follower, to permit the portion of slits 50 and 58 in the incoming and outgoing beams to vary in width in a predetermined manner relative to wavelength.

In the monochromator shown in FIG. 4 the drive devices 60, 64, 65, 67 and 68 will all include an element carried by a single common camshaft, such as 30 of FIG. 2, driven by the wavelength drive means and disposed parallel to the central optical axis 57 of planoconcave mirror 52. It will be appreciated that such a system is mechanically simpler and more readily achieved than in the conventional Ebert monochromator in which an accurate mechanical drive must be provided to a grating in the region of slit plate 51 and in which if two gratings are employed, a further drive must be provided to index a grating table to position one or other of the gratings in the collimated beam from mirror 52.

Mirror 55 is positioned nearer mirror 52 than the grating(s) of a conventional Ebert monochromator and requires only to be rotated into one of two positions, one appropriate to each grating, which can be achieved without the need for a precise mechanical linkage with wavelength drive means 59. Precise positional adjustment of mirror 55 relative to concave mirror 52 and each grating is achieved by adjustment of set screws 70 and 71 limiting the degree of rotation of mirror 55.

A further advantage offered by a monochromator according to the invention is that optical adjustment following manufacture is considerably simplified. In prior art Ebert monochromators the relative orientation of diffraction grating axis and collimator mirror ("tilt") is achieved by fine adjustment of the position of the collimator mirror. Achieving the required coincidence between the focal plane of the collimator mirror and the slit plate also required positional adjustment of the collimator mirror. Two or more gratings incorporated in the monochromator require the collimator mirror 52 to be optimally placed with regard to each. As all adjustments to the collimator mirror are interactive, a compromise setting has to be accepted for the collimator mirror.

In the monochromator shown in FIG. 4, collimator mirror 52 can be clamped into a predetermined position during assembly and precise positional adjustment between it and each grating axis carried out by adjustment of the beam directing mirror e.g. by set screws 70, 71. Independent non-interactive tilt adjustment is thus achieved for each grating.

It will be appreciated that a single grating monochromator in accordance with the invention will readily accept a further grating without the need for adjustment of the collimator mirror, the only adjustment needed to accommodate the further grating being to the position of the beam directing mirror.

Adjustment of focussing is achieved in a non-interactive manner by arranging for rotating slit plate 51 to be axially adjustable towards or away from concave spherical mirror 52 until the focal plane of the mirror 52 and the plane of slit plate 51 coincide. With a rotating slit plate such as 51 this is conveniently effected by making the slit plate axially adjustable upon the mounting shaft. If fixed slits are employed, a common slit plate may be mounted for movement along the central optical axis of mirror 52 in a similar manner.

A double grating infra-red monochromator constructed in accordance with the invention, covering the range 200–4000 wavenumbers, employed a plano-concave spherical collimator mirror, surface aluminised, with a radius of curvature of 360 mm and a focal length of 180 mm. The overall dimensions of the mirror 13 were 120 mm by 60 mm.

The diffraction gratings had overall dimensions of 50 mm by 50 mm, of which an active area of 45 mm×45 mm was used. One grating, covering the range 200–600 wavenumbers, bore rulings of 25 lines/mm and the other, covering the range 600–4000 wavenumbers, 100 lines/mm.

The plane beam directing mirror was surface aluminised, and had dimensions of 70 mm by 60 mm. The entrance and exit slits of the monochromator were formed in a rotating slit plate, were centred upon the circumference of a circle of 37.5 mm radius and increased in width exponentially along their length to give a constant change of beam energy for a given angular rotation of the slit plate, at any point along their lengths.

FIG. 5 is a diagrammatic illustration of a dual beam spectrophotometer incorporating a monochromator according to the invention.

The spectrophotometer shown in FIG. 5 comprises a source of radiation 100, means for forming two beams of radiation, means for combining the two beams, a monochromator 101 in accordance with the present invention and such as has been shown in FIGS. 1, 2 or 4, a detector 102 and signal processing means 103.

Radiation from source 100, which may be the infrared, visible or ultra violet regions of the spectrum, is reflected by a mirror 104 along the path 105 which passes through a sample cell 106 within a measurement compartment 107. The radiation following path 105 is reflected by two further mirrors 108 and 109 onto a rotating sector mirror assembly 110 which alternately allows the radiation following the path 105 to fall on a mirror 111 or reflects it away from the mirror 111. Radiation from source 100 is also reflected by a mirror 112 along a second path 113 which passes through a reference cell 114, which is also located in the measurement compartment 107. The radiation following path 113 is reflected by two further mirrors 115 and 116 onto the rotating sector mirror assembly 110 which alternately reflects the radiation following the path 113 onto the mirror 111 or allows it to pass through and thus be directed away from the mirror 111. Thus a composite beam 117 which comprises pulses of radiation which have followed path 105 interlaced with pulses of radiation which have followed path 113 is formed. The rotating mirror 110 has successive sectors which are radiation transparent, radiation absorbing, radiation reflective and radiation absorbing in series thus caused the composite beam 117 to comprise interlaced pulses of radiation which have followed paths 105 and 113 respectively separated by periods in which radiation from the source 100 is interrupted. The composite beam 117 of wideband radiation is reflected by mirror 111 on to the entrance slit of monochromator 101 which selects radiation of a narrow band of wavelengths from the wideband radiation presented to the entrance slit. The narrow band radiation emerging from the exit slit of monochromator 101 is reflected onto a detector 102 by a mirror 118. The output of the detector 102 is fed via signal processing means 103 to an indicator 119. Indicator 119 is typically a chart recorder in which the chart is advanced in synchronism with the wavelength of the narrowband radiation emerging from the monochromator 101. However, other indicators could be used, for example video display units or the output of the signal processing means could be fed to a computer which could either store the information or drive a printer to produce a print out of transmittance against wavelength.

In order to determine the transmittance of a sample at one wavelength, or a series of wavelengths, the sample is inserted in the measurement compartment 107 so as to be traversed by the sample beam 105 and the signal processing means 103 arranged to determine the ratio of the magnitudes of the radiation emerging from the sample cell 106 to that emerging from the reference cell 114, containing a reference material.

We claim:

1. An Ebert monochromator comprising:
   a concave spherical mirror,
   means for defining first and second slits lying in a plane perpendicular to the central optical axis of said concave spherical mirror,
   a diffraction grating pivotable about an axis parallel to diffraction grooves of said grating and being positioned off of said central optical axis of said concave spherical mirror, wherein said axis is parallel to said central optical axis of said concave spherical mirror,
   beam directing means for receiving from said concave spherical mirror a beam of light which passes through said first slit and directing said beam to said diffraction grating, and for receiving a reflected beam of light from said diffraction grating and directing said reflected beam of light to said concave spherical mirror to pass through said second slit,
   wherein the optical center line of said beam of light directed to said diffraction grating and the optical center line of said reflected beam of light from said diffraction grating lie in a plane at right angles to said diffraction grooves.

2. A monochromator according to claim 1, wherein said slit defining means is a common lamina in which said slits are apertures, and wherein said lamina is mounted for movement along said central optical axis of said concave spherical mirror.

3. A monochromator according to claim 2, wherein said lamina is rotatable about said central optical axis of said concave spherical mirror.

4. A monochromator according to claim 3, wherein said rotatable lamina is driven by a common cam shaft forming part of a wavelength drive mechanism, said cam shaft being parallel to said central optical axis of said concave spherical mirror.

5. A monochromator according to claim 1, wherein said beam directing means is a plane mirror.

6. A monochromator according to claim 1, wherein at least one further diffraction grating is included pivotable about an axis parallel to diffraction grooves of said further diffraction grating, and being positioned off of said central optical axis of said concave spherical mirror, and wherein said beam directing means is positionable to include either said diffraction grating or said further diffraction grating in the optical path of the monochromator.

7. A monochromator according to claim 6, wherein said diffraction grating and said further diffraction grating are pivotable about axes both disposed parallel to said central optical axis of said concave spherical mirror.

8. A monochromator according to claim 6 or claim 7, wherein said beam directing means is position adjustable in synchronism with pivoting of said diffraction grating and said further diffraction grating by a common wavelength drive mechanism.

9. A monochromator according to claim 8, wherein said diffraction grating, said further diffraction grating, and said beam directing means are driven by a common cam shaft forming part of said wavelength drive mechanism, and wherein said common cam shaft is parallel to said central optical axis of said concave spherical mirror.

10. A monochromator according to claim 9, wherein a movable filter holder is included to introduce a selected one of a plurality of filters into said beam of light entering said first slit, and wherein said filter holder is driven by said common cam shaft.

11. A monochromator according to claim 7, wherein said slit defining means is a common lamina in which said slits are apertures, and wherein said lamina is mounted for movement along said central optical axis of said concave spherical mirror.

12. A monochromator according to claim 11, wherein said lamina is rotatable about said central optical axis of said concave spherical mirror.

13. A monochromator according to claim 12, wherein said rotatable lamina is driven by a common cam shaft forming part of a wavelength drive mechanism, said cam shaft being parallel to said central optical axis of said concave spherical mirror.

14. A monochromator according to claim 7, wherein said beam directing means is a plane mirror.

* * * * *